United States Patent Office 2,963,473
Patented Dec. 6, 1960

2,963,473

SUBSTANTIVE AZO DYESTUFFS

Jakob Benz, Muenchenstein, and August Schweizer, Muttenz, Switzerland, assignors to Sandoz A.G., Basel, Switzerland, a Swiss firm No Drawing. Filed July 28, 1958, Ser. No. 751,120

Claims priority, application Switzerland Aug. 5, 1957

6 Claims. (Cl. 260—153)

The production of green substantive dyestuffs by combining a yellow aminoazo dyestuff and a blue aminoanthraquinone dyestuff by means of a triazine compound containing two or three halogen atoms is known.

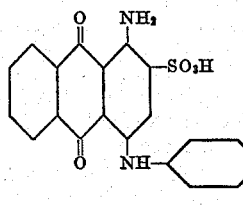

The dyestuffs of this type which are manufactured on a technical scale have certain deficiencies which considerably limit their use in textile dyeing. The brightest members of this group of green direct dyestuffs, for example, are not sufficiently soluble for many purposes and are highly sensitive to salt, while other dyestuffs of the group having better solubility give appreciably duller shades than the first-named.

The employment for the production of green substantive dyestuffs of the above-mentioned type of yellow aminoazo dyestuffs containing in the adjacent position to the amino group an ionic water-soluble group is not described in the literature. The reason for this may be that aminoazo dyestuffs which contain a sulfonic acid group in adjacent position to the amino group, for example 4-amino-1.1'-azobenzene-3.4'-disulfonic acid, can be condensed with halogen triazines only with very poor yields or not at all. In view of this it would be expected that aminoazo dyestuffs with a carboxyl group in ortho-position to the amino group would be similarly unamenable to condensation with halogen triazines. However, it has been found that this is by no means the case, but that aminoazo dyestuffs containing a carboxyl group in adjacent position to the amino group can be condensed with halogen triazines with surprising ease and with good yields. In conjunction with suitable aminoanthraquinone dyestuffs brilliant green direct dyestuffs can be obtained which are superior to the known bright green substantive dyestuffs in solubility and compatibility with salt while being at least equal to them in brilliancy and purity of shade.

The present invention accordingly relates to substantive azo dyestuffs of the general formula

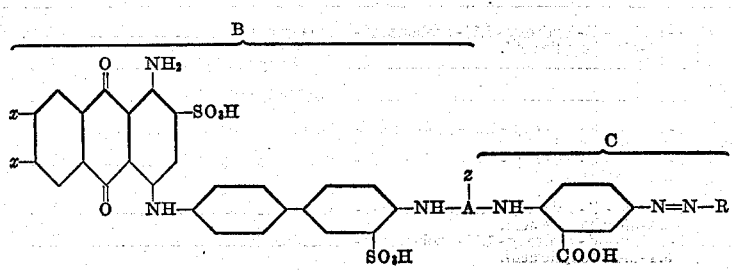

wherein

R stands for a radical of the benzene series substituted with a sulfonic acid group or a carboxylic acid group or a carboxylic acid group plus a hydroxy group in ortho-position thereto, A for the trivalent radical of a triazine compound in which the three halogen atoms originally linked to carbon atoms have been replaced by the two amine radicals B and C and the substituent z.

z for halogen or an amino group which may be mono- or disubstituted,

One x for hydrogen or chlorine, and

The second x for hydrogen, fluorine, chlorine or bromine, with the proviso that the two x's may not be two different halogens.

Of especial value are the substantive azo dyestuffs of the general formula

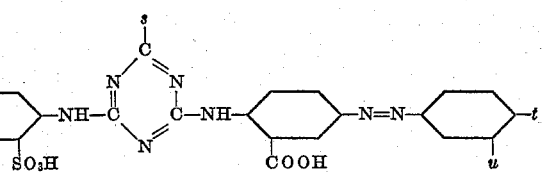

wherein s stands for a chlorine atom, an amino or a phenylamino group t stands for a hydrogen atom, a hydroxy or a sulfonic acid group, and u stands for a sulfonic acid group, when t denotes hydrogen, for a carboxylic acid group, when t denotes the hydroxy group, and for a hydrogen atom, when t denotes a sulfonic acid group.

The process for their production consists in condensing in either order one mol of a triazine compound containing three halogen atoms linked to carbon atoms with one mol of an aminomonoazo compound of the formula

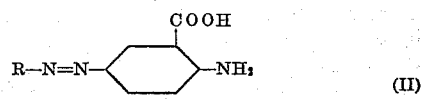

wherein R has the aforecited meaning, and with one mol of 1-amino-4-[4'-(4''-amino)-phenyl]-phenyl-aminoanthraquinone-2.3''-disulfonic acid or with one mol of a derivative thereof substituted in the 6 and/or 7 positions by halogen, and, if desired, in exchanging the third halogen atom of the triazine ring in the resultant condensation product for the hydroxyl group or an amino group which may be mono- or disubstituted.

Examples of suitable radicals R are 4-hydroxy-3-carboxyphenyl, 3-hydroxy-4-carboxyphenyl and 3- or 4-sulfophenyl.

The 1-aminoanthraquinone-2-sulfonic acids of formula B—H are obtained by condensation of the corresponding 1-amino-4-halogen-anthraquinone-2-sulfonic acids, e.g. 1-amino-4-bromoanthraquinone-2-sulfonic acid, 1-amino- 4.6-dibromoanthraquinone-2-sulfonic acid, 1-amino-4-bromo-6- or -7-chloroanthraquinone-2-sulfonic acid, 1-amino - 4 - bromo - 6.7 - dichloroanthraquinone - 2 - sulfonic acid and 1-amino-4-bromo-6-fluoroanthraquinone-2-sulfonic acid with 4.4'-diamino-1.1'-diphenyl-3-sulfonic acid.

Illustrative of the triazine compounds having three exchangeable halogen atoms linked to carbon atoms which are suitable for the production of the new azo dyestuffs of this invention are cyanuric chloride and cyanuric bromide.

The condensation of amines with triazine compounds containing mobile halogen atoms is known. It is further known that the production of the primary condensation product, i.e. the replacement of the first halogen atom by the radical of an amine, proceeds without difficulty. For this reason temperatures around 0° C. are chosen for the operation. The replacement of the second halogen atom by the radical of an amine requires a slightly higher temperature, for example 30° to 60° C. while replacement of the third halogen atom can only be accomplished at higher temperatures, e.g. 80° to 100° C., and with a readily reactive amine. Examples of amines of the required reactivity are aminobenzene, aminobenzenesulfonic acids, aminobenzenecarboxylic acids, 1 - amino-4-acetylaminobenzene, N-methylaminobenzene, methylamine, dimethylamine, ethylamine, diethylamine, mono- and diethanolamine. This third halogen atom can also be exchanged for the hydroxyl or the amino group or it can be left in the dyestuff molecule; in this last case the dyeing operation is so conducted that this third halogen atom is exchanged for the residue of cellulose, yielding a chemical combination between the substrate and the dyestuff.

The new substantive azo dyestuffs possess good solubility in water and good compatibility with salt as well as good affinity for cotton and fibers of natural or regenerated cellulose. They migrate well and reserve cellulose acetate; the dyeings or printings on cotton are resistant to prolonged boiling and high temperatures. These dyestuffs are therefore outstandingly suitable for dyeing and printing the above-mentioned cellulosic fibers in green shades of good fastness to light, water, washing and perspiration.

Those dyestuffs which contain a metallizable grouping in the radical R can be aftercoppered on the fiber, whereby the dyeings are given substantially improved fastness to wet agencies.

In the following examples the parts and percentages are by weight and the temperatures in degrees centigrade.

EXAMPLE 1

A neutral to weakly alkaline solution of 30.1 parts of 4-amino-4'-hydroxy-1.1'-azobenzene - 3.3'-dicarboxylic acid in 600 parts of water is added in the course of 1 hour to a dispersion of 18.4 parts of cyanuric chloride in 300 parts of icewater. The mass is stirred for a further hour at 0–3°, during which time a dilute sodium carbonate solution is dropped in so that the condensation product gives a constant weakly acid reaction.

Subsequently, the primary condensation product formed is filtered off and added to a solution of 60.9 parts of sodium 1-amino-4-[4'-(4''-amino)-phenyl]-phenylamino-anthraquinone-2.3''-disulfonate in 800 parts of water. The mass is heated to 60–65° and stirred for 10 hours, a weakly acid reaction being maintained by gradual addition of a dilute sodium carbonate solution. After the addition of 18 parts of aminobenzene the reaction mass is heated at 95° for 2 hours. The ternary condensation product now formed is salted out, filtered off and dried. The dyestuff is purified in the normal manner by redissolving and reprecipitating.

The yellow aminoazo dyestuff used here can be obtained by coupling diazotized 2-chloro-5-aminobenzene-1-carboxylic acid with 2-hydroxybenzene-1-carboxylic acid and subsequently exchanging the chlorine atom in the monoazo dyestuff formed for the amino group. The reaction with an aqueous ammonia solution is conducted preferably at temperatures above 100° and if desired in the presence of catalysts such as copper salts.

The new dyestuff is a dark green powder which dyes cotton and regenerated cellulosic fibers from aqueous solution in bright green shades; on aftercoppering the shades become faster to washing and yellower.

The same green azo dyestuff is obtained when the anthraquinone derivative is first reacted with cyanuric chloride, and then the aminoazo compound and finally the aminobenzene.

The dyeing method is as follows.

0.2 part of the dyestuff obtained according to the above example is dissolved in 300 parts of lime-free water. 10 parts of wetted cotton fabric are entered in the bath at 30° and the temperature increased to 100° in 30 minutes and maintained at this point for 15 minutes. During dyeing 3–4 parts of sodium sulfate, dissolved 1:10 in water, are added in portions. After dyeing the cotton is left in the bath for 15–20 minutes to cool to 50° and then removed, rinsed with water, squeezed out and dried. The dyed cotton is aftertreated with copper sulfate or, preferably, with a basic cationic copper complex compound (obtainable according to Swiss Patents 253,709 and 261,048–52) which gives greatly improved fastness properties, especially to washing.

EXAMPLE 2

When the 30.1 parts of 4-amino-4'-hydroxy-1.1'-azobenzene-3.3'-dicarboxylic acid in Example 1 are replaced by 32.1 parts of 4-amino-3-carboxy-1.1'-azobenzene-3'- or -4'-sulfonic acid, a green substantive dyestuff is obtained giving attractive green shades on cotton which have good light and washing fastness but cannot be aftercoppered.

In the following table are listed examples of further dyestuffs having the general Formula I, which can be produced according to the method detailed in Example 1. Cyanuric chloride is the halogen triazine used in all these examples.

The examples are characterized in columns B—H and C—H by the basic substances of the substituents B and C of general Formula I, by the substituent z in column z and by the shade of the dyeings on cotton.

Table

| Ex. No. | B—H | C—H | z | Shade on Cotton |
|---|---|---|---|---|
| 3 | 1-amino-6-chloro-4-[4'-(4''-amino)-phenyl]-phenyl-aminoanthra-quinone 2.3''-disulfonic acid. | 4-amino-4'-hydroxy-1.1'-azobenzene-3.3'-dicarboxylic acid. | Phenylamino | Green. |
| 4 | 1-amino-7-chloro-4-[4'-(4''-amino)-phenyl]-phenyl-aminoanthraquinone-2.3''-disulfonic acid. | ----do---- | 3-carboxy-phenylamino | Do. |
| 5 | 1-amino-6.7-dichloro-4-[4'-(4''-amino)-phenyl]-phenylaminoanthraquinone-2.3''-disulfonic acid. | ----do---- | 4-sulfophenylamino | Do. |
| 6 | 1-amino-6-bromo-4-[4'-(4''-amino)-phenyl]-phenyl-aminoanthraquinone-2.3''-disulfonic acid. | 4-amino-3-carboxy-1.1'-azobenzene-4'-sulfonic acid. | 3-sulfophenylamino | Do. |
| 7 | 1-amino-6(7)-fluoro-4-[4'-(4''-amino)-phenyl]-phenylamino-anthraquinone-2.3''-disulfonic acid (Technical Mixture). | 4-amino-3-carboxy-1.1'-azobenzene-3'-sulfonic acid. | 2-hydroxyethylamino | Do. |
| 8 | 1-amino-4-[4'-(4''-amino)-phenyl]-phenylamino-anthraquinone-2.3''-disulfonic acid. | 4-amino-4'-hydroxy-1.1'-azobenzene-3.3'-dicarboxylic acid. | Chlorine | Do. |
| 9 | ----do---- | 4-amino-3'-hydroxy-1.1'-azobenzene-3.4'-dicarboxylic acid. | ----do---- | Do. |

Table—Continued

| Ex. No. | B—H | C—H | z | Shade on Cotton |
|---|---|---|---|---|
| 10 | 1 - amino - 4 - [4' - (4'' - amino) - phenyl] - phenylamino anthraquinone-2,3''-disulfonic acid. | 4 - amino - 4' - hydroxy - 1,1' - azobenzene - 3,3'-dicarboxylic acid. | Amino | Green. |
| 11 | ...do... | ...do... | Methylamino | Do. |
| 12 | ...do... | ...do... | Di - (2 - hydroxyethyl) - amino | Do. |
| 13 | ...do... | ...do... | N - methyl - N - phenylamino | Do. |
| 14 | ...do... | ...do... | 4-carboxy-phenylamino | Do. |
| 15 | ...do... | ...do... | Di-ethylamino | Do. |
| 16 | ...do... | 4 - amino - 1,1' - azobenzene - 3,4' - dicarboxylic acid. | Dimethylamino | Do. |
| 17 | ...do... | 4 - amino - 1,1' - azobenzene - 3,2' - dicarboxylic acid. | Ethylamino | Do. |

Formulae of representative dyestuffs of the foregoing examples are:

Example 1

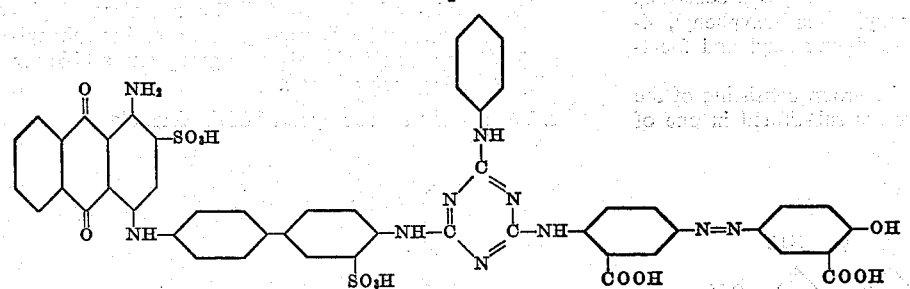

Example 2

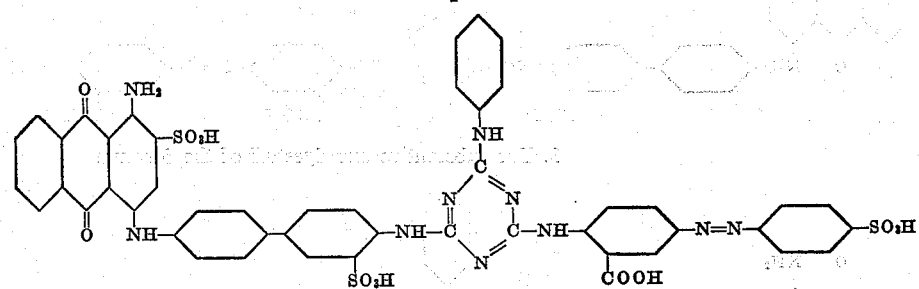

and

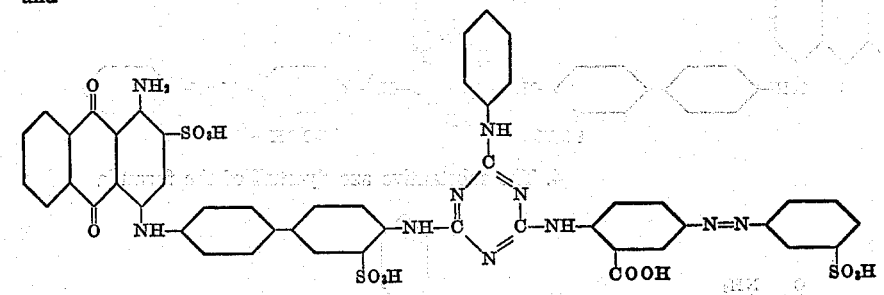

Example 8

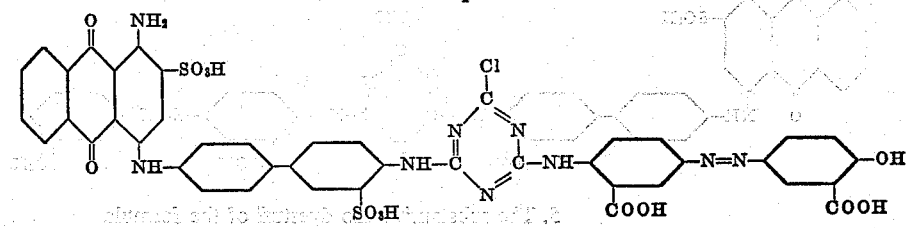

Example 10

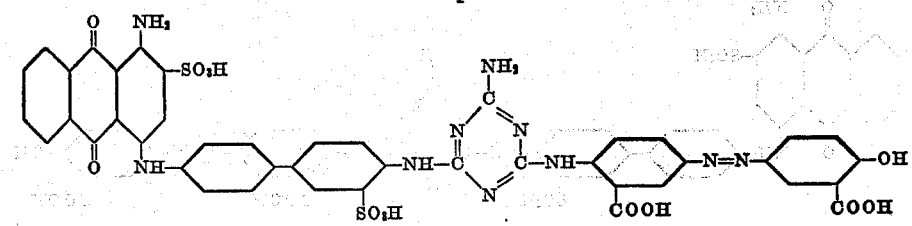

Having thus disclosed the invention what we claim is:

1. A substantive azo dyestuff of the formula

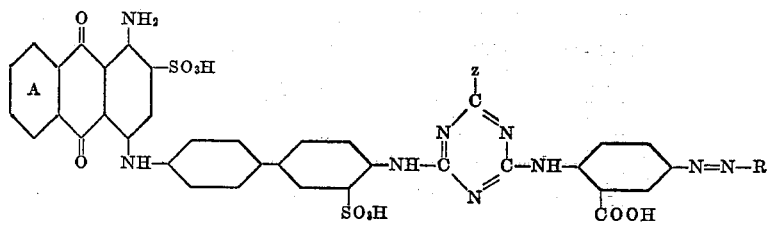

wherein

R represents a radical selected from the group consisting of 3-sulfophenyl, 4-sulfophenyl, 2-carboxyphenyl, 4-carboxyphenyl, 3-hydroxy-4-carboxyphenyl and 3-carboxy-4-hydroxyphenyl, A is a nucleus selected from the group consisting of the unsubstituted nucleus, a nucleus substituted in one of the positions 6 and 7 by a halogen atom and a nucleus substituted in both positions 6 and 7 by chlorine atoms, z represents a member selected from the group consisting of a chlorine atom, an amino group, a lower alkylamino group, a lower hydroxyalkylamino group, a di-(lower alkyl)-amino group, a di-(lower hydroxyalkyl)-amino group, a phenylamino group, a carboxyphenylamino group, a sulfophenylamino group and a N-lower alkyl-N-phenylamino group.

2. The substantive azo dyestuff of the formula

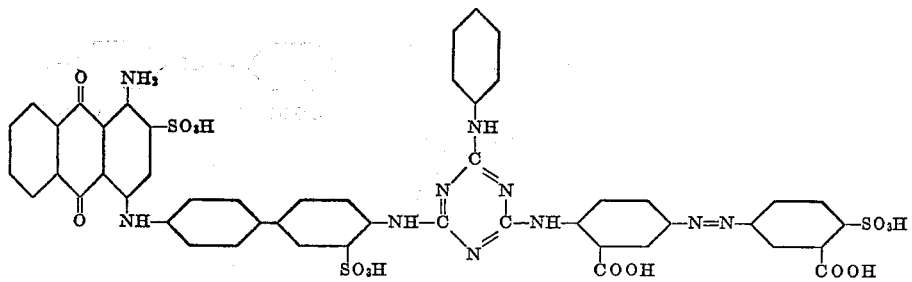

3. The substantive azo dyestuff of the formula

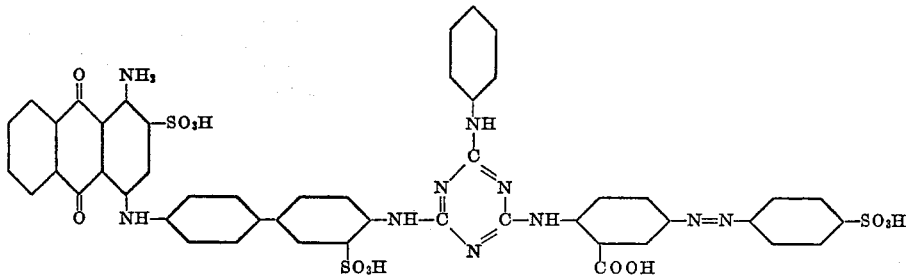

4. The substantive azo dyestuff of the formula

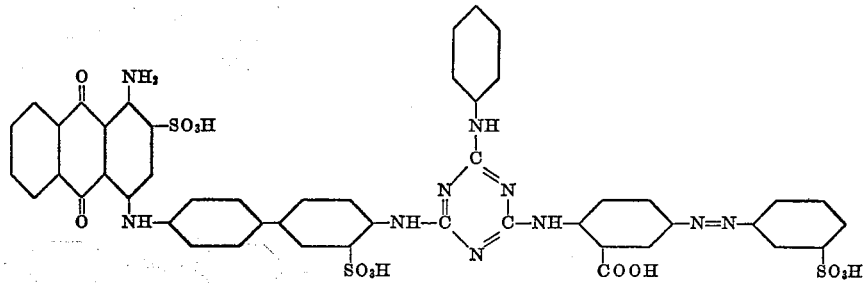

5. The substantive azo dyestuff of the formula

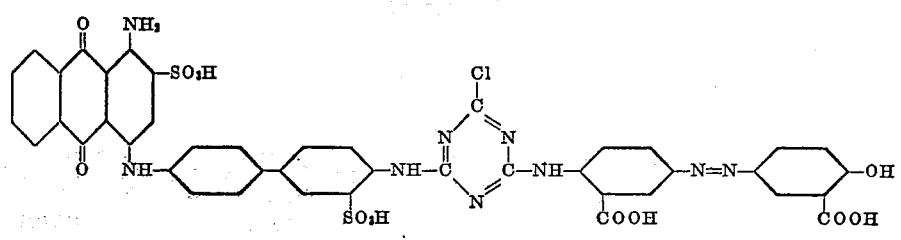

6. The substantive azo dyestuff of the formula
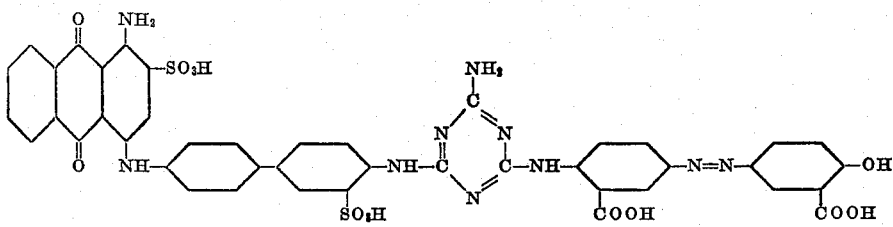
References Cited in the file of this patent
UNITED STATES PATENTS
| | | |
|---|---|---|
| 2,167,804 | Gubler et al. | Aug. 1, 1939 |
| 2,391,164 | Kaiser | Dec. 18, 1945 |
FOREIGN PATENTS
| | | |
|---|---|---|
| 466,886 | Great Britain | June 4, 1937 |

UNITED STATES PATENT OFFICE
CERTIFICATION OF CORRECTION

Patent No. 2,963,473                      December 6, 1960

Jakob Benz et al.

It is hereby certified that error appears in the above numbered patent requiring correction and that the said Letters Patent should read as corrected below.

Column 8, claim 2, for the right-hand portion of the formula reading

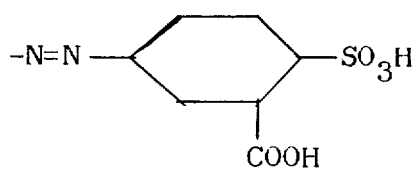 read 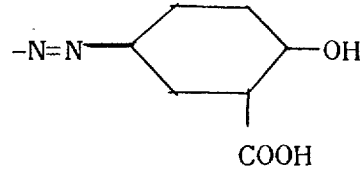

Signed and sealed this 6th day of June 1961.

(SEAL)
Attest:

ERNEST W. SWIDER
Attesting Officer

DAVID L. LADD
Commissioner of Patents